(12) United States Patent
Amendolea

(10) Patent No.: US 9,446,744 B2
(45) Date of Patent: Sep. 20, 2016

(54) LOW PROFILE ROTARY PLATFORM

(71) Applicant: Richard M. Amendolea, Canfield, OH (US)

(72) Inventor: Richard M. Amendolea, Canfield, OH (US)

(73) Assignee: Centricity Corporation, Girard, OH (US)

( * ) Notice: Subject to any disclaimer, the term of this patent is extended or adjusted under 35 U.S.C. 154(b) by 16 days.

(21) Appl. No.: 14/195,177

(22) Filed: Mar. 3, 2014

(65) Prior Publication Data

US 2014/0291466 A1  Oct. 2, 2014

Related U.S. Application Data

(60) Provisional application No. 61/772,285, filed on Mar. 4, 2013.

(51) Int. Cl.
| | |
|---|---|
| *A47F 5/025* | (2006.01) |
| *B60S 13/02* | (2006.01) |
| *F16M 11/08* | (2006.01) |
| *A47B 11/00* | (2006.01) |
| *E04H 6/40* | (2006.01) |

(52) U.S. Cl.
CPC ............. *B60S 13/02* (2013.01); *F16M 11/08* (2013.01); *A47B 11/00* (2013.01); *A47F 5/025* (2013.01); *E04H 6/40* (2013.01)

(58) Field of Classification Search
USPC ................ 108/22, 103, 139, 142; 248/349.1
See application file for complete search history.

(56) References Cited

U.S. PATENT DOCUMENTS

| | | | | |
|---|---|---|---|---|
| 2,600,922 | A * | 6/1952 | Rodolfa | 384/614 |
| 2,648,579 | A * | 8/1953 | Slyter et al. | 384/615 |
| 4,635,894 | A * | 1/1987 | Sammons | 248/558 |
| 5,079,789 | A * | 1/1992 | Jandrakovic | 5/81.1 RP |
| 6,354,540 | B1 * | 3/2002 | Lewis | B64G 1/646 |
| | | | | 244/172.4 |
| 7,798,067 | B2 | 9/2010 | Starnes | |
| 8,967,578 | B2 * | 3/2015 | Laurita | 248/346.06 |

\* cited by examiner

*Primary Examiner* — Alfred J Wujciak
(74) *Attorney, Agent, or Firm* — The Webb Law Firm

(57) ABSTRACT

A rotary platform includes a rotating top plate rotatable about axis and a stationary base plate fixed in relation to the axis. A plurality of bearing elements is disposed in a cavity defined, at least in part, by the base plate and the top plate. The top plate is supported by the plurality of bearing elements, which are rotatable in any direction and about any axis. The top plate is flexible and flexes independently of the base plate. Flexing of the top plate allows the top plate to maximize contact with as many of the bearing elements as possible to improve the load carrying capacity of rotary platform.

7 Claims, 9 Drawing Sheets

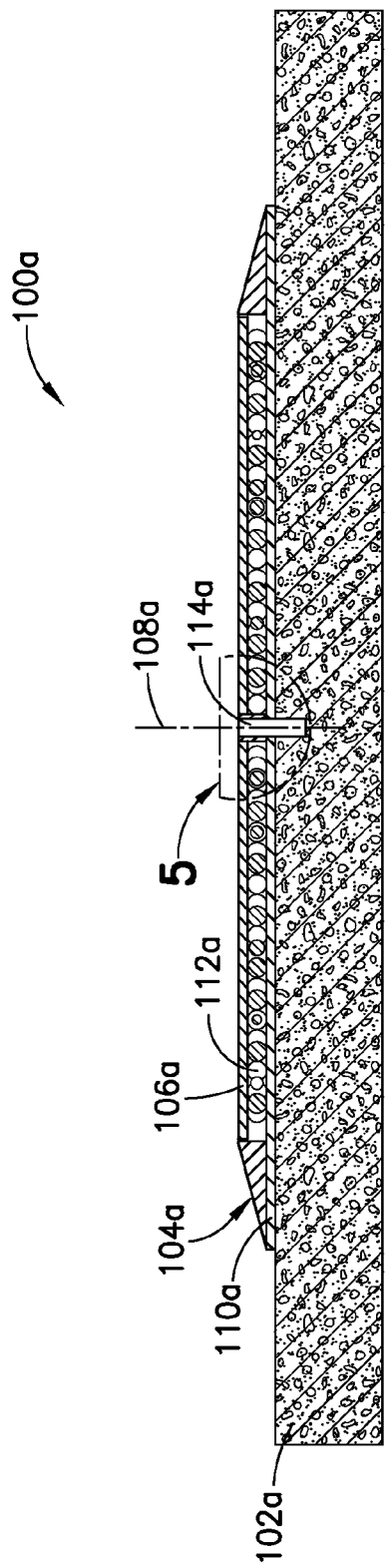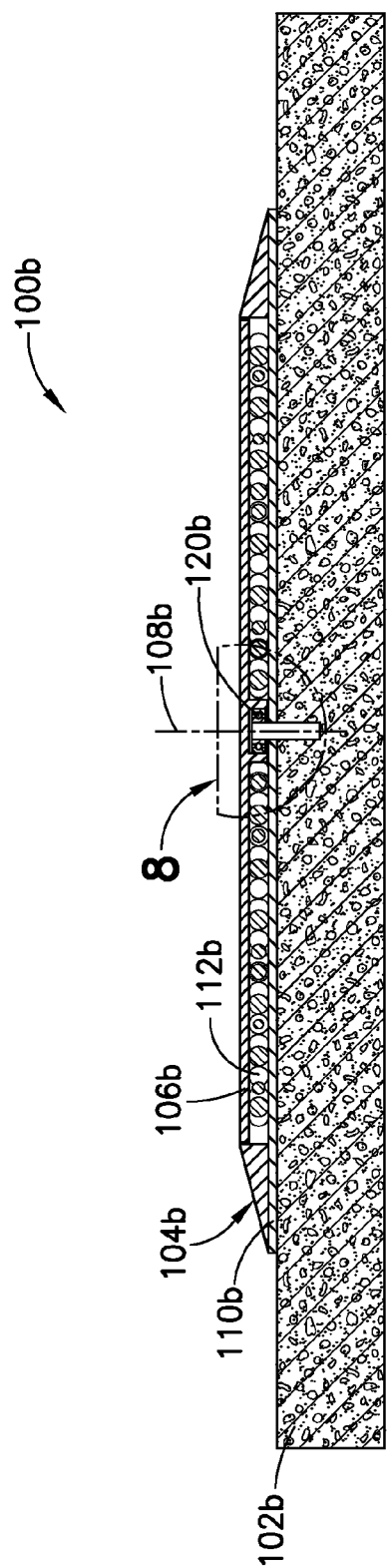

LOW PROFILE ROTARY PLATFORM

CROSS REFERENCE TO RELATED APPLICATION

This application claims priority to U.S. Provisional Patent Application No. 61/772,285, filed Mar. 4, 2013, entitled "Low Profile Rotary Platform", the disclosure of which is incorporated herein by reference in its entirety.

BACKGROUND OF THE INVENTION

1. Field of the Invention

The invention described herein relates generally to a low profile rotary platform and, particularly, to a low profile rotary platform having a stationary base plate and a rotating top plate separated by a bearing assembly.

2. Description of Related Art

In many industrial or household applications, it is desirable to provide a rotary platform adapted for supporting a load and rotating about a rotation axis. Conventional rotary platforms may be hand powered or include a powered means, such as a motor, for rotating the platform about its rotation axis. Within the prior art, rotary turntables are known to have a spoke-like unit with a central bearing and a series of roller bearings or casters spaced around the periphery of the platform. Additional rollers may be spaced along the spokes. However, existing turntables have a high profile relative to ground level, which increases the height to which a load must be lifted before being placed on the turntable. One conventional solution is to sink the turntable into the ground; however, such operation requires a modification of the floor and often complicates the installation of the turntable.

U.S. Pat. No. 7,798,067 to Starnes is directed to a turntable for a heavy object, such as a car, that includes a ground-engaging member and a load-supporting platform. The ground-engaging member and load-supporting platform have load surfaces facing each other. The load-supporting platform is supported off the ground-engaging member by a plurality of rotary bearing elements distributed across an extended region of the load surfaces to allow rotation of the load-supporting platform with respect to the ground-engaging member. However, the ground-engaging member and the load-supporting platform are constrained together to flex as a single unit.

While various rotary platforms are known, improved low profile platforms that do not require excavation to reduce the overall height of the platform relative to ground level continue to be in demand. Additionally, there is a need in the art for improved rotary platforms that do not require a rigid foundation to prevent flexing of the platform components.

SUMMARY OF THE INVENTION

In view of the various disadvantages of prior art rotary platforms described above, there is a need for an improved low profile rotary platform. While various embodiments of the low profile rotary platform according to the present invention are described in detail herein, one preferred and non-limiting embodiment of a low profile rotary platform includes a stationary base plate and a load-supporting rotating top plate rotatable about a substantially vertical axis. A plurality of bearing elements are disposed between the stationary base and the rotating top plate to support the rotating top plate and facilitate rotation of the rotating top plate relative to the stationary base plate. The rotating top plate flexes independently of the stationary base plate.

In another preferred and non-limiting embodiment, the rotary platform is adapted for installation on any flat, rigid surface (e.g., a concrete floor) with ordinary tools. In cases where the installation surface is not flat, self-leveling concrete or other similar material can be applied prior to installation to obtain a flat, level surface. A stationary base plate attaches to the rigid surface to create a non-flexing, non-rotating base. Multiple bearing elements are positioned on or in connection with the platform of the stationary base plate so that the rotating top plate is sufficiently supported. Because the rotating top plate is sufficiently supported along its entire surface area, the overall height of the rotary platform is low to the ground. The rotating top plate can be flexible and flex independently of the stationary base plate. Flexing of the rotating top plate allows the top plate to come in contact with as many bearing elements as possible to further improve the load carrying capacity of the rotary platform. The bearing elements can be set in a cage or grid to constrain their movement in a particular direction about a particular axis. Alternatively, the bearing elements may be freely spread across the platform of the base plate, such that the bearing elements are free to rotate about any axis in any direction. In one embodiment, the rotating top plate is centered with respect to a stationary base plate by a bushing arrangement or bearing arrangement. In another preferred and non-limiting embodiment, a ramp is added around the circumference of the rotating top plate in order to remove any restriction access to the platform.

In accordance with another preferred and non-limiting embodiment, a low profile rotary platform may include a base plate, a load-supporting top plate rotatable about a substantially vertical axis relative to the base plate, and a bearing assembly positioned between the base plate and the top plate for rotatably supporting the top plate. The top plate may be configured for flexing under load independently of the base plate. The bearing assembly may include a plurality of bearing elements that have a plurality of, e.g., five, degrees of freedom. In one configuration, the plurality of bearing elements may be supported on a planar surface of the base plate. In another configuration, the plurality of bearing elements may be supported within a plurality of corresponding pockets formed on the base plate.

The rotary platform may further include a cage disposed between the base plate and the top plate, wherein the cage has a plurality of openings, with each opening configured to receive therein at least one bearing element. Additionally, the rotary platform may include an axle extending in a substantially vertical direction from a central portion of the base plate, wherein the axle defines the substantially vertical axis. An annular bushing may be configured for receiving the axle therethrough. The annular bushing may extend from a bottom surface of the top plate toward the base plate or from a top surface of the base plate toward the top plate. Alternatively, an annular bearing may be configured for receiving the axle therethrough. The annular bearing may be received inside a bearing sleeve formed on the base plate or the top plate.

In accordance with yet another preferred and non-limiting embodiment, a low profile rotary platform may include a base plate, an axle oriented in a substantially vertical direction, the axle defining a rotation axis, and a load-supporting top plate rotatable about the axle relative to the base plate. A bearing assembly having a plurality of bearing elements may be positioned between the base plate and the top plate for rotatably supporting the top plate. The bearing elements may have a plurality of, e.g., five, degrees of freedom. The top plate may be configured for flexing under load independently of the base plate. The plurality of bearing elements may be supported on a planar surface of the base plate. Alternatively, the plurality of bearing elements may be supported within a plurality of corresponding pockets formed on the base plate. In another configuration, a cage may be disposed between the base plate and the top plate. The cage may have a plurality of openings, with each opening configured to receive therein at least one bearing element. An annular bushing may configured for receiving the axle therethrough. The annular bushing may extend from a bottom surface of the top plate toward the base plate or from a top surface of the base plate toward the top plate. Alternatively, an annular bearing may be configured for receiving the axle therethrough. The annular bearing may be received inside a bearing sleeve formed on the base plate or the top plate.

These and other features and characteristics of the low profile rotary platform, as well as the methods of manufacture and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 3 is a cross-sectional view of the low profile rotary platform shown in FIG. 1;

FIG. 6 is a cross-sectional view of a second embodiment of a low profile rotary platform according to the principles of the present invention;

DETAILED DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
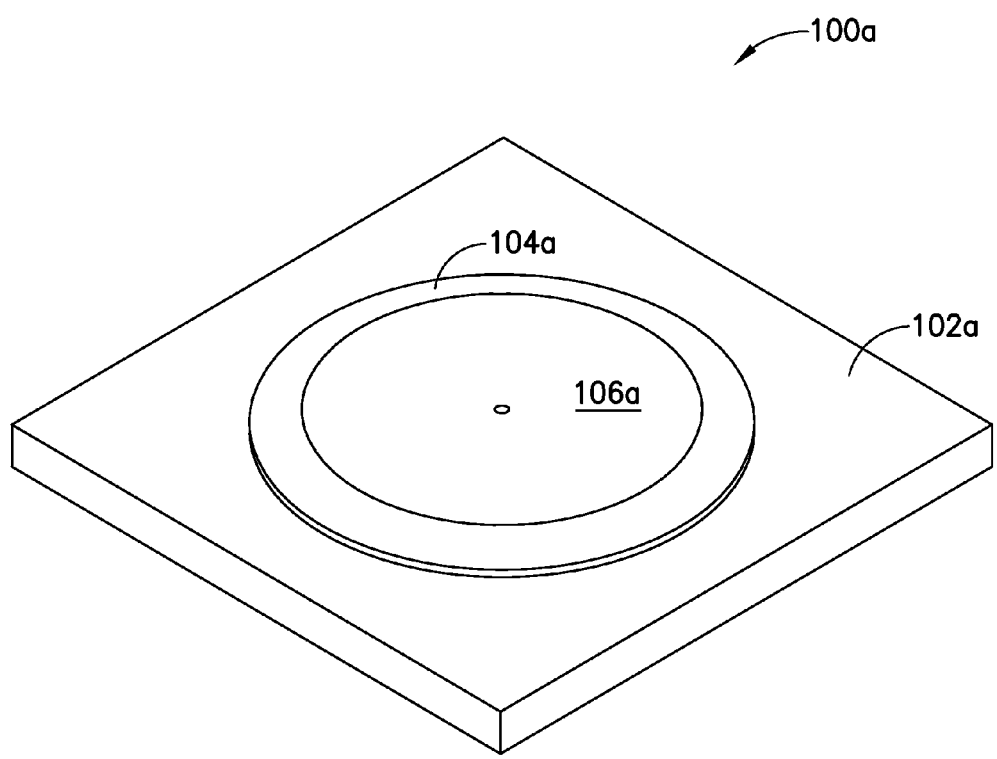
FIG. 1 is a perspective view of a first embodiment of a low profile rotary platform according to the principles of the present invention.
Figure 2:
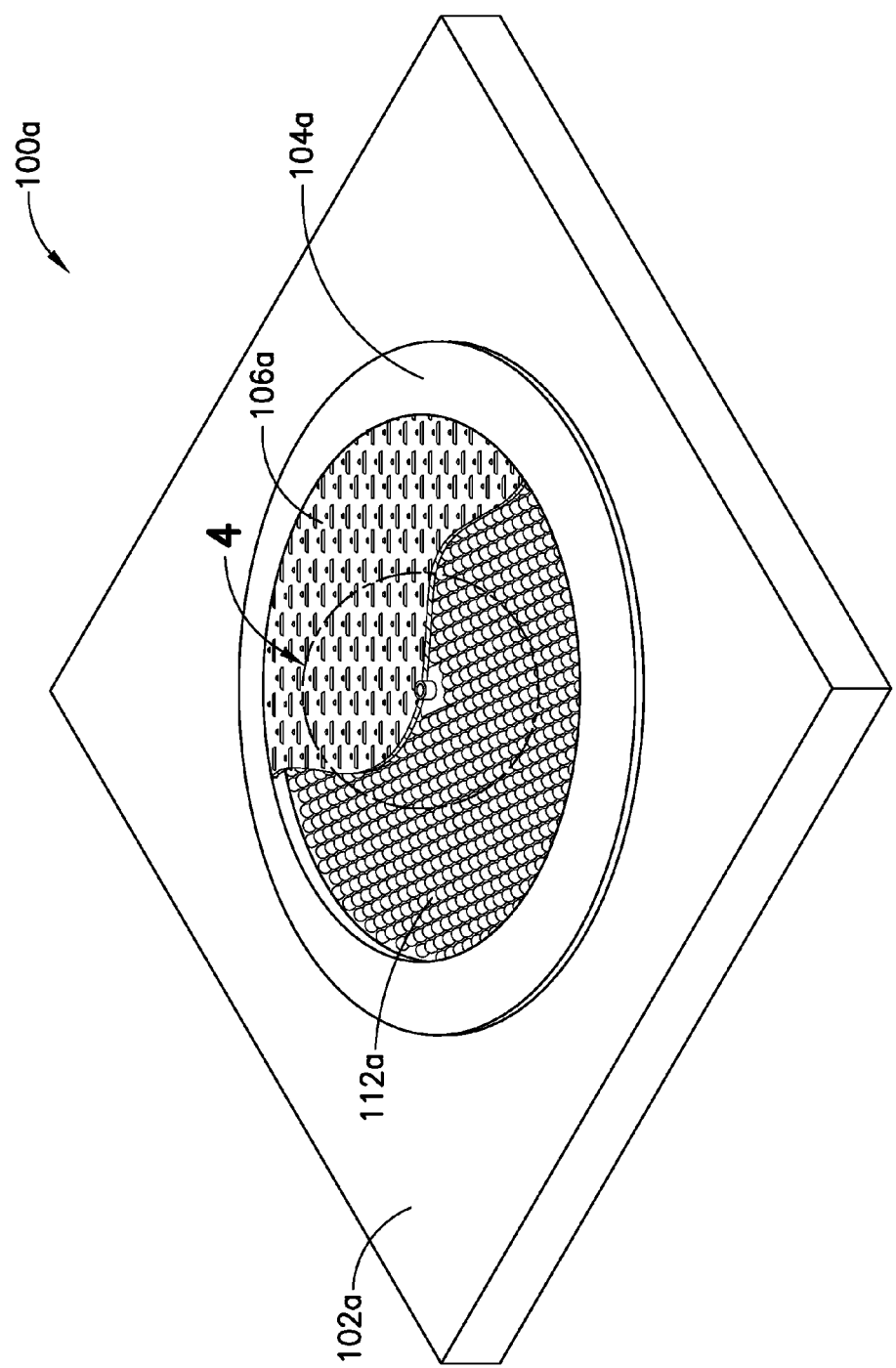
FIG. 2 is a perspective view of the rotary platform shown in FIG. 1 with a portion of an upper rotary plate cut away.

With reference to FIGS. 1-2, rotary platform 100a is shown in accordance with one preferred and non-limiting embodiment. Rotary platform 100a is adapted for household and industrial uses, including, but not limited to, providing rotating platforms for individuals in wheelchairs, providing rotating platforms in elevators or other enclosed quarters to facilitate rotational movement of various objects. In addition, rotary platform 100a is adapted to provide rotatable support for vehicles, such as cars, motorcycles, and airplanes. Other applications of rotary platform 100a include rotatable shelving, rotatable stage sets, rotatable file storage systems, rotatable industrial workstations, rotatable vending machine clusters, and rotatable platforms for industrial equipment. One of ordinary skill in the art will appreciate that other uses of rotary platform 100a that are not expressly enumerated herein are not precluded. The rotary platform 100a may be human powered or rotatably driven by a rotary arrangement, such as an automated arrangement. For example, the rotary platform 100a can be center-driven by a hydraulic motor or electrically with a motor gearbox assembly. It can be gear-, chain- or belt-driven through a pinion gear, sprocket, or pulley near the axis of rotation. It can alternatively be driven at its periphery by a chain, belt, friction wheel, and/or teeth.

Rotary platform 100a is adapted for installation on a mounting pad 102a, such as a concrete pad. Mounting pad 102a desirably provides a flat and rigid mounting surface for installing rotary platform 100a. In one preferred and non-limiting embodiment, rotary platform 100a is fastened, welded, glued, or otherwise mechanically attached to mounting pad 102a. Rotary platform 100a may be permanently affixed to mounting pad 102a, or it may be removably connected thereto. Further, at least a portion of mounting pad 102a may be a preexisting flat surface or area, or may be an existing mounting pad, concrete pad, foundation member, or the like.

With continuing reference to FIGS. 1-2, rotary platform 100a is provided with a ramp 104a to facilitate delivery of a load from mounting pad 102a to rotary platform 100a, and vice versa. As shown in FIG. 3, ramp 104a is secured to a lower portion of rotary platform 100a such that it extends around an outer circumference of the rotary platform 100a. In an alternate embodiment, ramp 104a is secured directly to mounting pad 102a. In yet another preferred and non-limiting embodiment, rotary platform 100a is positioned within a cavity (not shown) provided on mounting pad 102a to reduce the vertical height of rotary platform 100a relative to mounting pad 102a. Rotary platform 100a may be mounted within the cavity on mounting pad 102a to be at a same vertical level as mounting pad 102a and define a substantially continuous, level surface. In such an embodiment, ramp 104a may not be necessary.

With reference to FIG. 3, rotary platform 100a includes a rotating top plate 106a that is rotatable about a substantially vertical axis 108a and a stationary base plate 110a that is fixed in relation to axis 108a. Rotating top plate 106a and stationary base plate 110a may be made from a metal or metal alloy material, including, but not limited to, stainless steel, carbon steel, and aluminum. The use of other materials, such as plastics, is not precluded. Rotating top plate 106a may have at least one protrusion in the form of one or more traction elements 107a (shown in FIG. 4) to provide increased traction on the surface of top plate 106a and/or to protect the upper surface of the top plate 106a. Rotating top plate 106a is supported by or on a plurality of bearing elements 112a (also shown in FIGS. 2 and 4) that define a bearing assembly. The plurality of bearing elements 112a is disposed in a cavity defined by stationary base plate 110a on a lower side, rotating top plate 106a on an upper side, and ramp 104a along an outer circumference of rotating top plate 106a. Each of the plurality of bearing elements 112a is rotatable in any direction along a plane defined by stationary base plate 110a. Additionally, each of the plurality of bearing elements 112a is rotatable about any axis. Thus, each of the bearing elements has five degrees of freedom. As shown in FIG. 5, each bearing element 112a has a substantially solid spherical shape and is made from a metal or a durable plastic material. In another preferred and non-limiting embodiment, some or all of the bearing elements 112a may have an outer coating or hardened shell to increase the strength of the bearing element 112a. In another preferred and non-limiting embodiment, some or all of the bearing elements 112a may have an outer coating that is formed from a low-friction or slippery material to enhance the rotation of the top plate 106a over the bearing elements 112a (i.e., the contact points between the top plate 106a and the bearing elements 112a). Still further, a wall of the base plate 110a and/or the top plate 106a may be used in place of the ramp 104a as a bounding surface to contain the bearing elements 112a.

Rotating top plate 106a is flexible and/or resilient and flexes independently of stationary base plate 110a. Flexing of rotating top plate 106a allows the top plate to come in contact with as many of the plurality of bearing elements 112a as possible to improve the load carrying capacity of rotary platform 100a. Accordingly, at least a portion of top plate 106a can be formed from a flexible material, a resilient material, a synthetic material, a plastic material, and the like.

Figure 4:
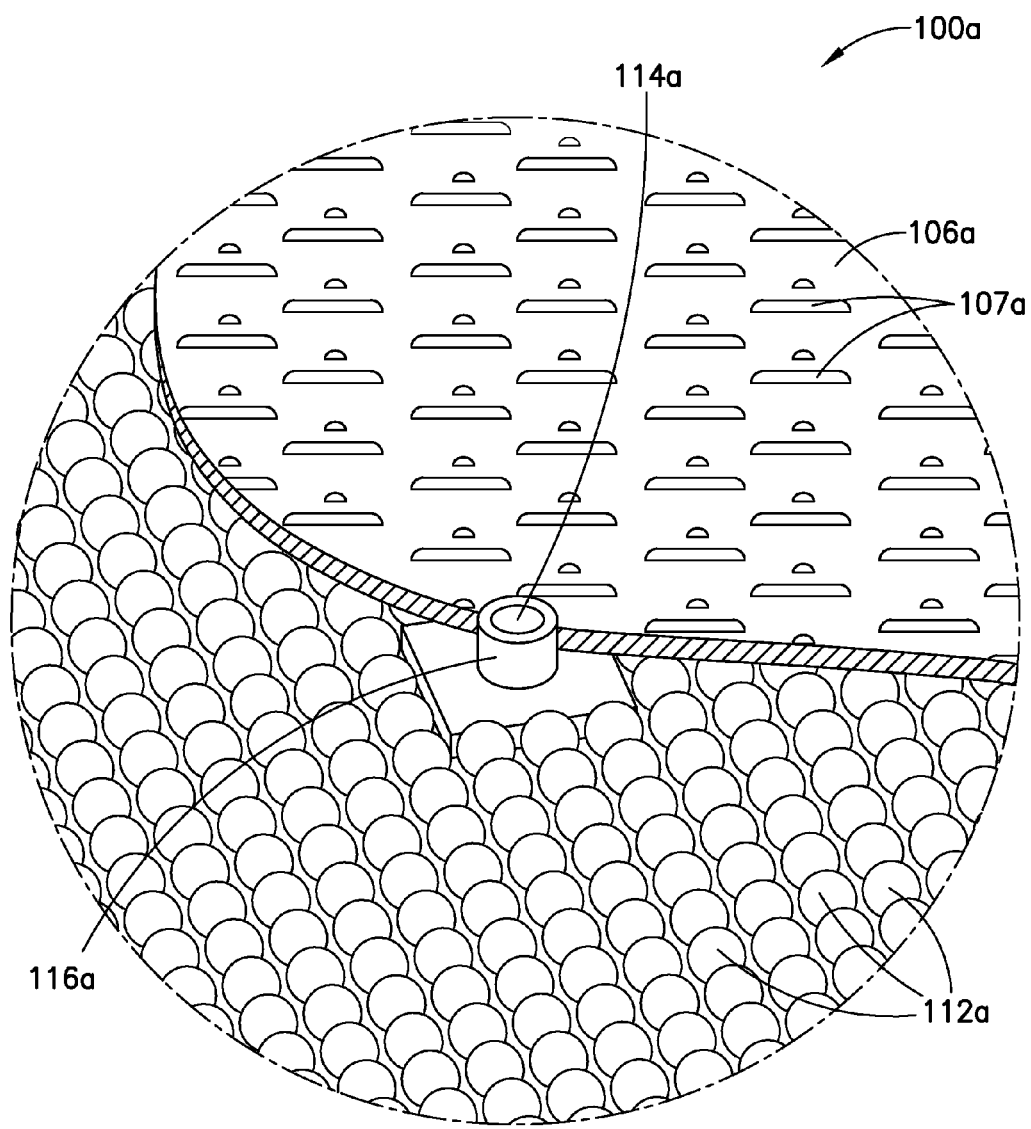
FIG. 4 is an enlarged perspective view of a central portion of the rotary platform shown in FIG. 3.
Figure 5:
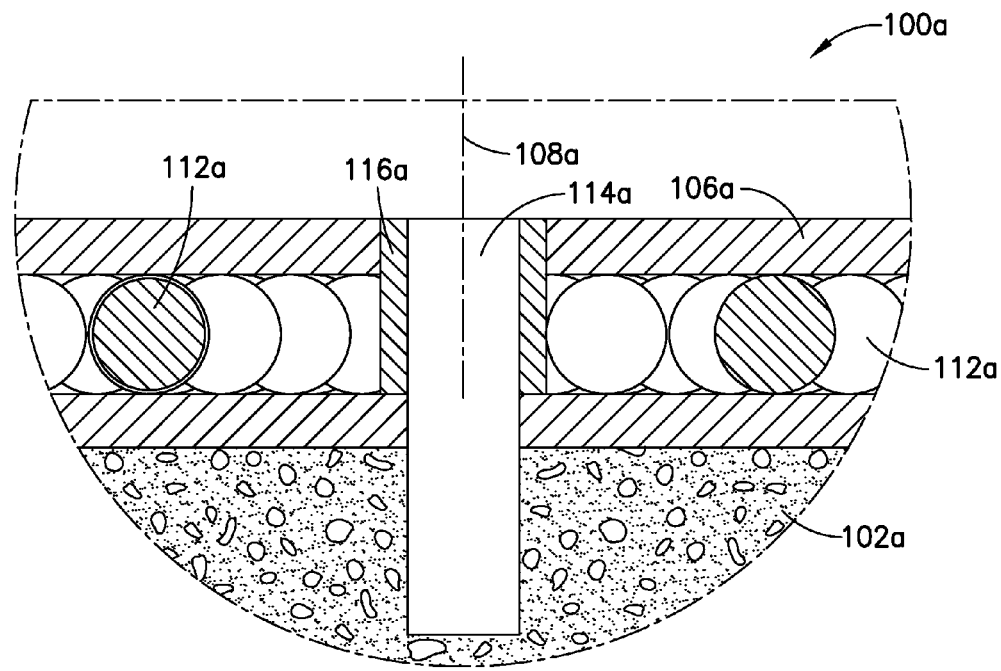
FIG. 5 is an enlarged view of Detail A shown in FIG. 3.

With reference to FIGS. 4-5, rotating top plate 106a is rotatable about an axle 114a provided in a central portion of stationary base plate 110a. Axle 114a is substantially vertically oriented with axis 108a extending through its center and along its longitudinal length. Axle 114a may extend vertically upward from stationary base plate 110a or it may be embedded directly in mounting pad 102a. In one preferred and non-limiting embodiment, axle 114a is a solid shaft, while in another embodiment, axle 114a is a hollow tube. As further shown in FIGS. 4-5, a bushing 116a surrounds axle 114a for aligning rotating top plate 106a relative to axis 108a. Bushing 116a has a generally annular shape having an inner diameter adapted to fit around an outer diameter of axle 114a. Bushing 116a is desirably directly secured to rotating top plate 106a at an opening 118a located in a central portion of rotating top plate 106a. As best shown in FIG. 4, center axle 114a and bushing 116a are exposed on an upper side of rotating top plate 106a. Lubricant (not shown) may be provided at an interface between axle 114a and bushing 116a. Bushing 116a is adapted for absorbing radial loads with respect to axis 108a. Thrust loads in a substantially vertical direction are absorbed by the plurality of bearing elements 112a.

Figure 8:
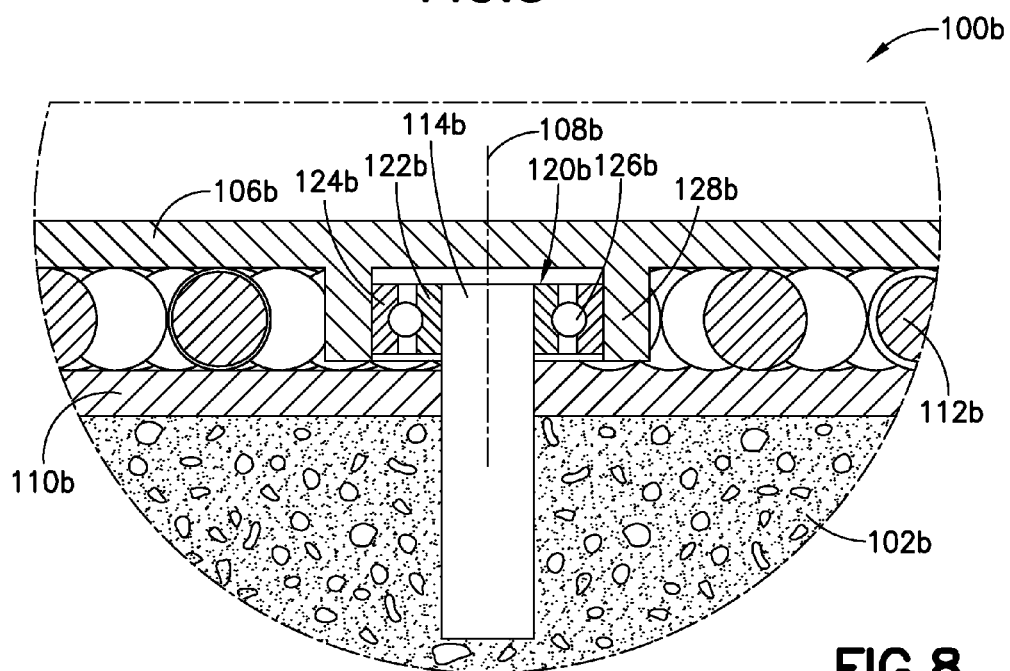
FIG. 8 is an enlarged view of Detail B shown in FIG. 6.
Figure 7:
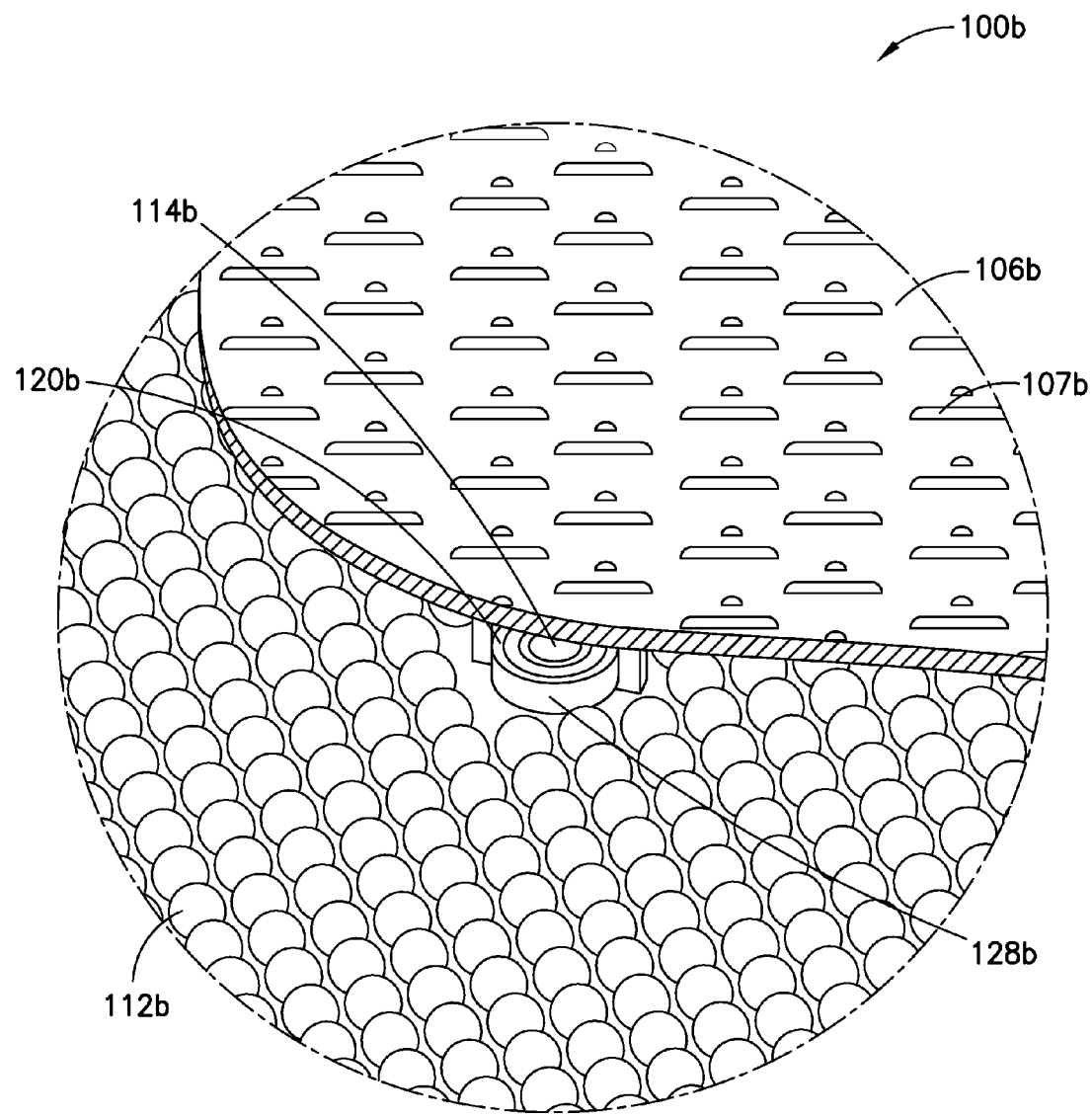
FIG. 7 is an enlarged perspective view of a central portion of the rotary platform shown in FIG. 6.

With reference to FIGS. 6-8, rotary platform 100b is illustrated in accordance with a second preferred and non-limiting embodiment. Rotary platform 100b is substantially similar to rotary platform 100a described above, and reference numerals 100b-114b in FIGS. 6-8 are used to illustrate identical components as reference numerals 100a-114a in FIGS. 1-5. As the previous discussion regarding rotary platform 100a, generally shown in FIGS. 1-5, is applicable to the embodiment shown in FIGS. 6-8, only the relevant differences between these rotary platforms are discussed hereinafter.

With particular reference to FIGS. 7-8, a bearing 120b surrounds axle 114b for aligning rotating top plate 106b relative to axis 108b. Bearing 120b has a generally tubular shape having an inner race 122b surrounded by an outer race 124b and a plurality of ball bearings 126b disposed between inner race 122b and outer race 124b to facilitate relative rotation of inner race 122b and outer race 124b. Inner diameter of inner race 122b is adapted to fit around the outer diameter of axle 114b. The outer diameter of outer race 124b is received inside a bearing sleeve 128b extending from a lower surface of rotating top plate 106b. Rotating top plate 106b has a continuous upper surface without any openings extending through a central portion. As best shown in FIG. 8, axle 114b and bearing 120b are not visible from an upper side of rotating top plate 106b. Lubricant (not shown) may be provided at an interface between axle 114b and bearing 120b. Bearing 120b is adapted for absorbing radial loads with respect to axis 108b. Thrust loads in a substantially vertical direction are absorbed by the plurality of bearing elements 112b.

Figure 9:
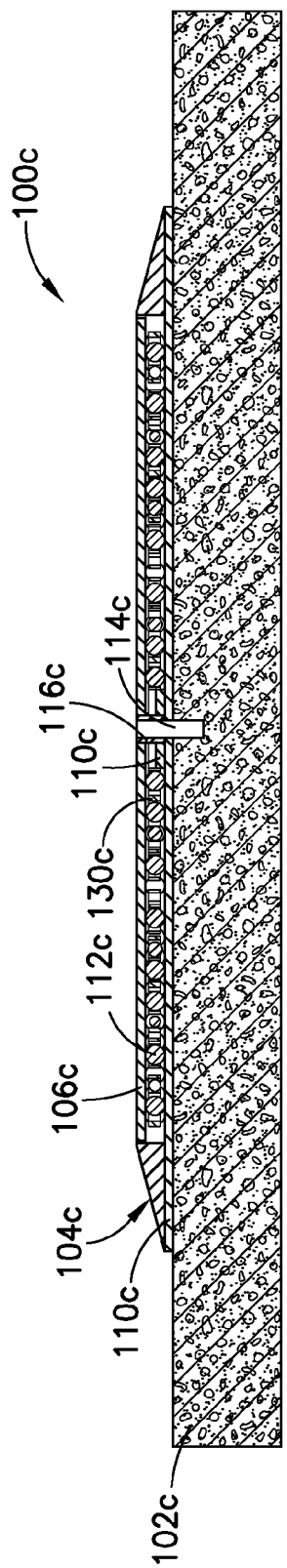
FIG. 9 is a cross-sectional view of a third embodiment of a low profile rotary platform according to the principles of the present invention.
Figure 10:
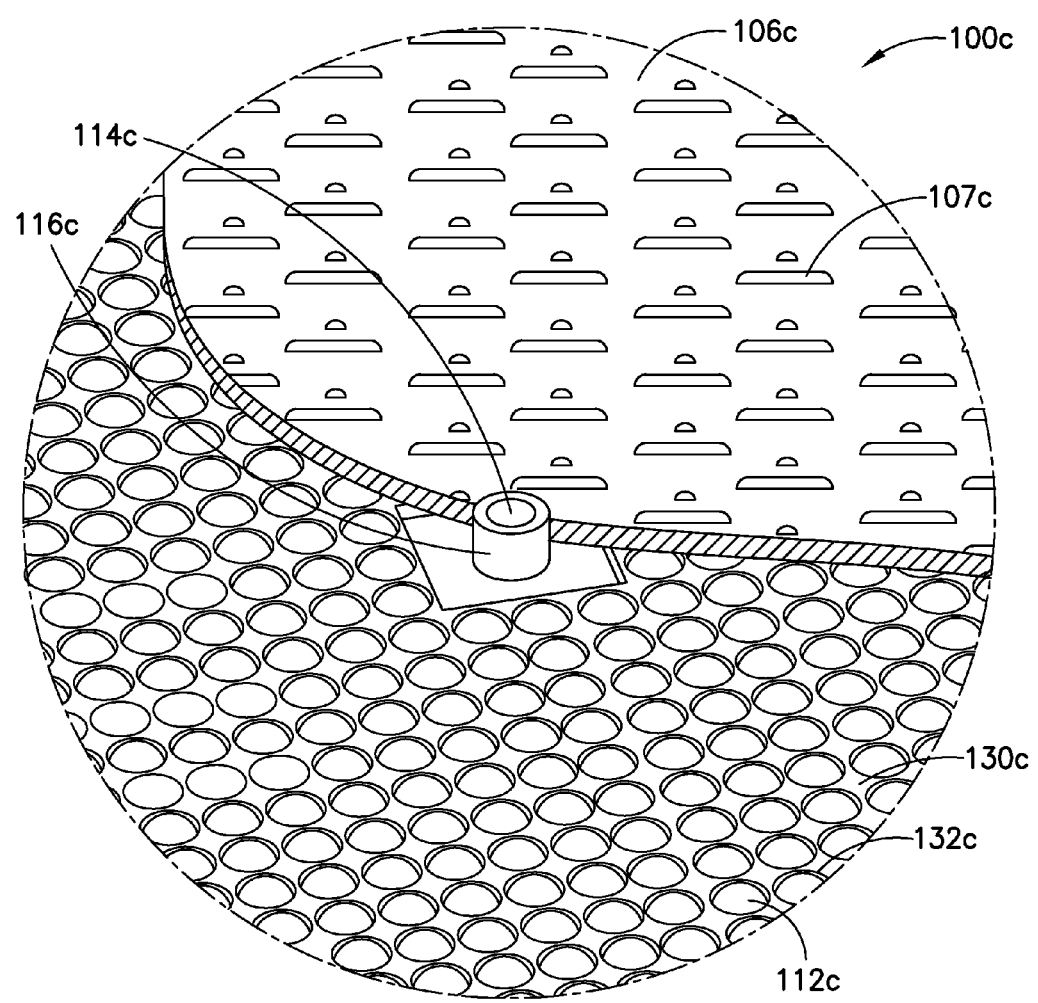
FIG. 10 is an enlarged perspective view of a central portion of the rotary platform shown in FIG. 9.

With reference to FIGS. 9-10, rotary platform 100c is illustrated in accordance with a third preferred and non-limiting embodiment. Rotary platform 100c is substantially similar to rotary platform 100a described above and reference numerals 100c-120c in FIGS. 9-10 are used to illustrate identical components as reference numerals 100a-120a in FIGS. 1-5. As the previous discussion regarding rotary platform 100a generally shown in FIGS. 1-5 is applicable to the embodiment shown in FIGS. 9-10, only the relevant differences between these rotary platforms are discussed hereinafter.

With particular reference to FIG. 10, the plurality of bearing elements 112c is received inside a grid or cage 130c. Cage 130c is disposed within a space defined by stationary base plate 110c at a lower end and rotating top plate 106c at an upper end. Cage 130c defines a plurality of openings 132c (e.g., square opening, round openings, etc.) adapted to receive at least one bearing element 112c inside each opening. In another embodiment, a plurality of bearing elements 112c is received within each opening 132c. The plurality of openings 132c is preferably distributed evenly across the surface of cage 130c, such that each opening 132c is substantially equidistant from the surrounding openings 132c. Cage 130c constrains the plurality of bearing elements 112c to rotate within the respective plurality of openings 132c. Movement of bearing elements 112c along the upper surface of stationary base plate 110c is prevented by cage 130c.

In another preferred and non-limiting embodiment, the cage 130c is configured to move and rotate (or spin) with the bearing elements 112c and the rotating top plate 106c. Accordingly, the cage 130c is connected to neither the rotating top plate 106c nor the stationary base plate 110c, but is rather formed as an independent (e.g., floating) structure. This ensures that the cage 130c is able to freely rotate as the bearing elements 112c are spinning in their respective openings 132c.

Figure 11:
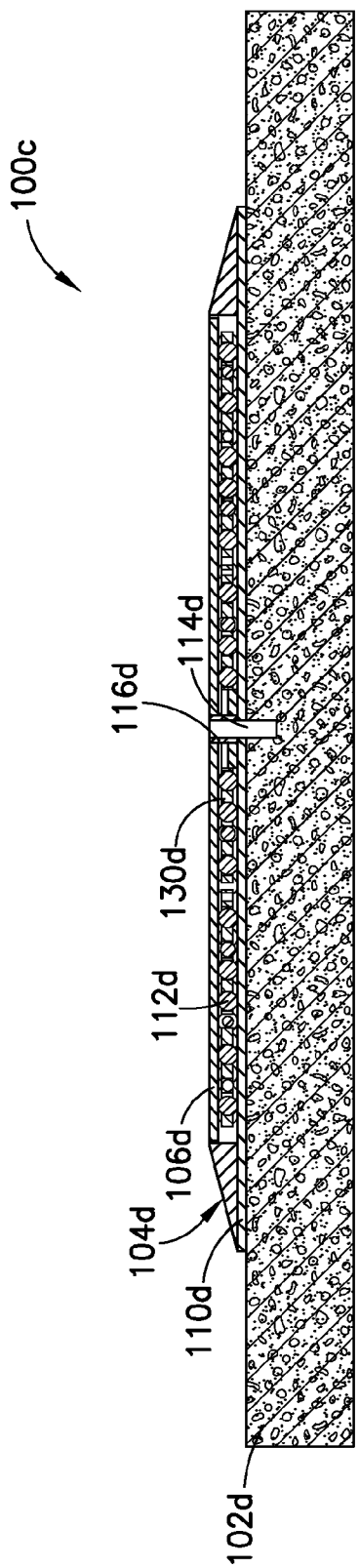
FIG. 11 is a cross-sectional view of a fourth embodiment of a low profile rotary platform according to the principles of the present invention.
Figure 12:
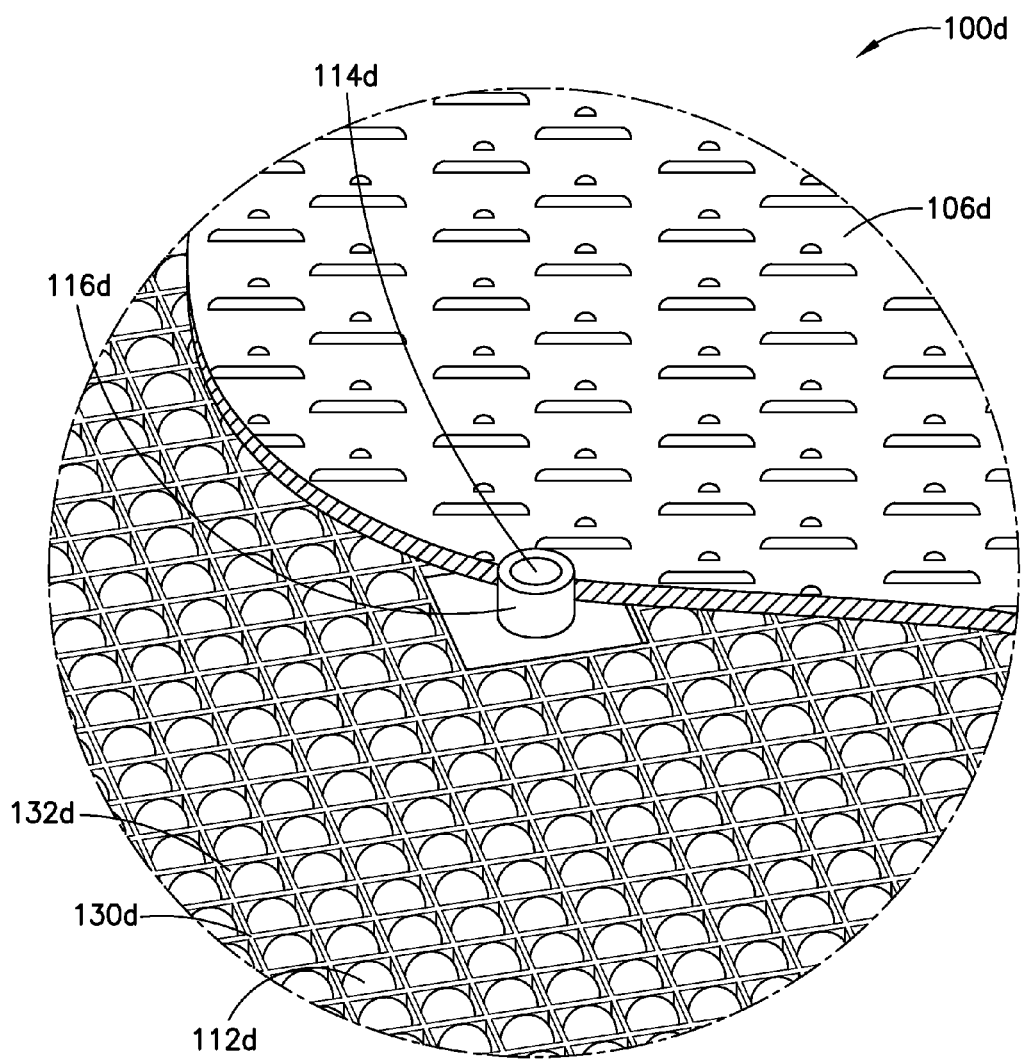
FIG. 12 is an enlarged perspective view of a central portion of the rotary platform shown in FIG. 11.

In a fourth embodiment shown in FIGS. 11-12, cage 130d has a plurality of substantially square openings 132d for receiving the plurality of bearing elements 112d. The remaining elements shown in FIGS. 11-12 are identical to elements 100c-116c shown in FIGS. 9-10. Still further, it is envisioned that depressions or pockets (not shown) can be positioned over the surface of the stationary base plate 110d. The bearing elements 112d are positioned in these pockets, thus operating in a manner similar to the cage 130c. Further, these depressions or pockets may be filled or contacted with a lubricant to facilitate the bounded rotation of the bearing elements 112d.

While embodiments of a low profile rotary platform were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

What is claimed is:

1. A low profile rotary platform comprising:
   a base plate;
   a load-supporting top plate rotatable about a substantially vertical axis relative to the base plate;
   a bearing assembly positioned between the base plate and the top plate for rotatably supporting the top plate, the bearing assembly comprising a plurality of bearing elements; and
   an axle extending in a substantially vertical direction from a central portion of the base plate, wherein the axle defines the substantially vertical axis,
   wherein the top plate is configured for flexing under load independently of the base plate, and
   wherein the plurality of bearing elements is supported on a planar surface of the base plate such that the plurality of bearing elements is movable in any direction on the planar surface of the base plate with five degrees of freedom.

2. The rotary platform of claim 1, wherein the plurality of bearing elements is supported within a plurality of corresponding pockets formed on the base plate.

3. The rotary platform of claim 1, further comprising a cage disposed between the base plate and the top plate, wherein the cage has a plurality of openings, with each opening configured to receive therein at least one bearing element.

4. The rotary platform of claim 1, further comprising an annular bushing configured for receiving the axle therethrough.

5. The rotary platform of claim 4, wherein the annular bushing extends from a bottom surface of the top plate toward the base plate or from a top surface of the base plate toward the top plate.

6. The rotary platform of claim 1, further comprising an annular bearing configured for receiving the axle therethrough.

7. The rotary platform of claim 6, wherein the annular bearing is received inside a bearing sleeve formed on the base plate or the top plate.

* * * * *